United States Patent
Yu et al.

(10) Patent No.: US 9,952,387 B2
(45) Date of Patent: Apr. 24, 2018

(54) OPTICAL FIBER TRANSMISSION SYSTEM WITH A LASER BEAM SPLITTING AND COMBINING DEVICE

(71) Applicant: ACME MICROSYSTEM INC., New Taipei (TW)

(72) Inventors: Hung-Chieh Yu, New Taipei (TW); Bing-Cheng Lai, New Taipei (TW)

(73) Assignee: ACME MICROSYSTEM INC., New Taipei (TW)

( * ) Notice: Subject to any disclaimer, the term of this patent is extended or adjusted under 35 U.S.C. 154(b) by 0 days.

(21) Appl. No.: 15/255,749

(22) Filed: Sep. 2, 2016

(65) Prior Publication Data

US 2018/0067263 A1    Mar. 8, 2018

(51) Int. Cl.
*G02B 6/28* (2006.01)
*G02B 6/32* (2006.01)

(52) U.S. Cl.
CPC ............ *G02B 6/2817* (2013.01); *G02B 6/32* (2013.01)

(58) Field of Classification Search
CPC .................................................. G02B 6/2817
See application file for complete search history.

(56) References Cited

U.S. PATENT DOCUMENTS

| 5,285,449 | A * | 2/1994 | Georgiou | H04L 12/44 370/360 |
| 7,081,996 | B2 * | 7/2006 | Wills | G02B 6/272 359/484.03 |
| 9,110,262 | B2 * | 8/2015 | Zeng | G02B 6/4246 |
| 2003/0016364 | A1* | 1/2003 | Thomas | G01B 9/021 356/457 |
| 2006/0238772 | A1* | 10/2006 | Hanson | G03H 1/0406 356/484 |
| 2011/0138506 | A1* | 6/2011 | Humphris | G01B 11/0608 850/6 |
| 2014/0153594 | A1* | 6/2014 | Jhang | B23K 26/06 372/6 |

* cited by examiner

*Primary Examiner* — Ryan Lepisto
*Assistant Examiner* — Erin Chiem
(74) *Attorney, Agent, or Firm* — Birch, Stewart, Kolasch & Birch, LLP

(57) ABSTRACT

An optical fiber transmission system with a laser beam splitting and combining device includes a laser beam splitting and combining device receiving a laser beam from a laser device and projecting the laser beam onto a target through an objective lens. The laser beam splitting and combining device has a beam splitter, two transmitters, two receivers and a beam combiner. When the beam splitter divides the received laser beam and transmits the divided laser beams to the transmitters, the transmitters transmit the divided laser beams to the receivers through two optical fibers. The receivers send the divided laser beams to the beam combiner for the beam combiner to combine the divided laser beams into an output laser beam projected on the target through the objective lens. Given the optical transmission path of the laser beam splitting and combining device, the laser transmission distance can be extended.

4 Claims, 3 Drawing Sheets

OPTICAL FIBER TRANSMISSION SYSTEM WITH A LASER BEAM SPLITTING AND COMBINING DEVICE

BACKGROUND OF THE INVENTION

1. Field of the Invention

The present invention relates to an optical fiber transmission system and, more particularly, to an optical fiber transmission system with a laser beam splitting and combining device.

2. Description of the Related Art

Using optical fiber for digital data communication has been a common practice for a while in the communication field. In optical fiber communication, data to be transmitted are sent to a light transmitter, signals generated after the data are superimposed or modulated are then carried and transmitted through carrier waves of a carrier, and the modulated carrier waves can be transmitted to a distal light receiver by way of transmission media. In view of the advantages of large communication capacity and high data security, nowadays, optical fiber communication has ranked as the most important wired communication.

One type of conventional optical transceivers available to current optical fiber communication allows them to transmit and receive different light beams through different optical fibers. As for those conventional optical transceivers, each includes a light module, a photodiode module, a lens module, and an optical splitter. The light module emits a first light beam. The lens module includes a receiving space to accommodate three lenses and the optical divisional unit. When the light module emits a light beam entering the receiving space through one of the lenses, the optical splitter directs the light beam into an optical fiber and transmits the light beam to the photodiode module.

According to the conventional technique in optical fiber communication, different light beams must be transmitted through different optical fibers. Such necessity leads to the use of many optical splitters, structural complication, oversized product and production cost escalation. To save more space, optical elements and lens in use need to be mounted in a congested space. In return, the tradeoff is to have a complicated system architecture, thus causing less flexibility in design of light transmission paths and limited transmission distance in optical fiber communication.

SUMMARY OF THE INVENTION

An objective of the present invention is to provide an optical fiber transmission system with a laser beam splitting and combining device providing a flexible optical transmission path and extended laser transmission distance through the use of the laser beam splitting and combining device.

To achieve the foregoing objective, the optical fiber transmission system includes an objective lens, a target, a laser device, and a laser beam splitting and combining device.

The laser beam splitting and combining device receives the laser beam, divides the laser beam, combines divided laser beams into an output laser beam, and transmits the output laser beam to be projected onto the target through the objective lens and includes a beam splitter, two light transmitters, two light receivers and a beam combiner.

The beam splitter receives the laser beam irradiated by the laser device and divides the laser beam into two laser beams with one of the divided laser beams going through the beam splitter and the other divided laser beam reflected by the beam splitter.

The two light transmitters are connected to the beam splitter and respectively transmit the divided laser beams.

The two light receivers are respectively connected to the two light transmitters through two optical fibers and receive the divided laser beams.

The beam combiner is connected to the light receivers, receives the divided laser beams, combines the divided laser beams into an output laser beam, and transmits the output laser beam to the objective lens.

Given the foregoing system architecture, the laser beam splitting and combining device receives laser beam irradiated from the laser device and projects the laser beam on the target. Specifically, the laser beam splitting and combining device divides and reflects the received laser beam to the transmitters. The transmitters further transmit the divided laser beams to the receivers. The receivers then combine the divided laser beams into an output laser beam to be projected onto the target through the objective lens. The foregoing light transmission path defined by the laser beam splitting and combining device ensures extended distance in transmitting laser beams.

Other objectives, advantages and novel features of the invention will become more apparent from the following detailed description when taken in conjunction with the accompanying drawings.

DETAILED DESCRIPTION OF THE INVENTION

Figure 1:
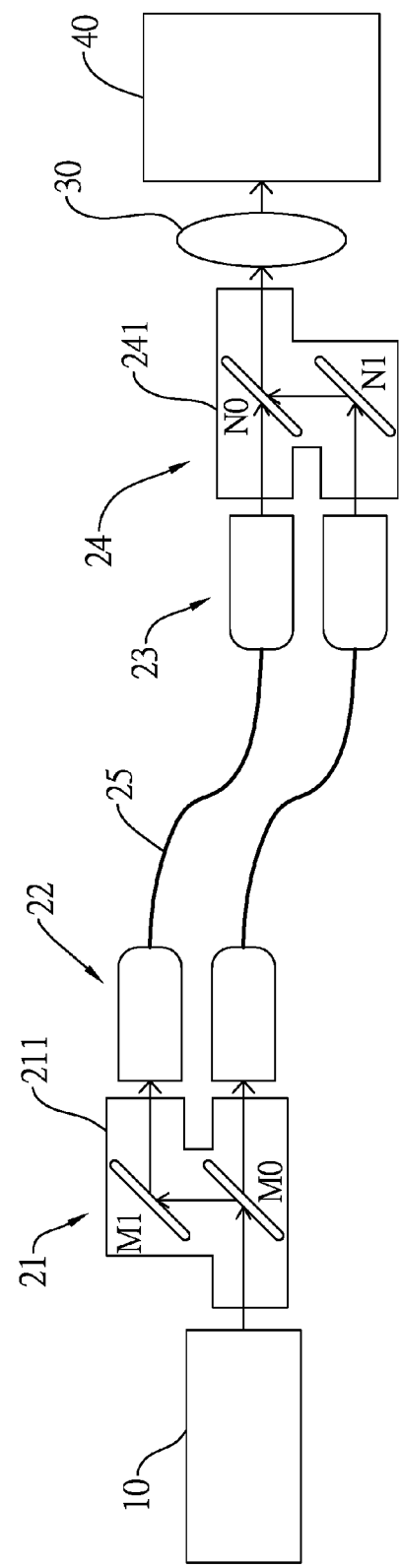
FIG. 1 is a schematic diagram showing system architecture of a first embodiment of an optical fiber transmission system with a laser beam splitting and combining device in accordance with the present invention.

With reference to FIG. 1, a first embodiment of an optical fiber transmission system with a laser beam splitting and combining device in accordance with the present invention includes a laser device 10, a laser beam splitting and combining device, an objective lens 30 and a target 40. The laser device 10 serves to irradiate a laser beam, which is received by the laser beam splitting and combining device. After the laser beam is split, is partially transmitted and is partially reflected, the resultant divided laser beams are further combined into an output laser beam by the laser beam splitting and combining device and the output laser beam is projected onto the target 40 through the objective lens 30.

The laser beam splitting and combining device includes a beam splitter 21, two light transmitters 22, two light receivers 23 and a beam combiner 24. The two light transmitters 22 are connected to the beam splitter 21. The two light receivers 23 are respectively connected to the two light transmitters 22 through two optical fibers 25. The beam splitter 21 receives a laser beam irradiated from the laser device 10. When the received laser beam is divided into two laser beams by the beam splitter 21, one of the laser beams is transmitted to one of the light transmitters 22 by way of directly going through the beam splitter 21 and the other laser beam is transmitted to the other light transmitter 22 by way of being reflected by the beam splitter 21. The two light transmitters 22 further transmit the two laser beams to the respective light receivers 23. When the two laser beams received by the respective light receivers 23 are combined into an output laser beam through the beam combiner 24, the output laser beam is projected by the beam combiner 24 onto the target 40 through the objective lens 30. Given the light transmission path of the laser beam splitting and combining device, the transmission distance of laser beams can be extended.

In the present embodiment, the beam splitter 21 has a first housing 211, a first primary reflective unit M0 and a first secondary reflective unit M1. The first housing 211 has an optical input end, two optical output ends and a first receiving space. The first receiving space communicates with the optical input end and the optical output ends.

The first primary reflective unit M0 and the first secondary reflective unit M1 are arranged in parallel in the first receiving space of the first housing 211 and are slanted at a first angle, such that the first primary reflective unit M0 corresponds to the optical input end and one of the two optical output ends of the first housing 211 and receives a laser beam irradiated by the laser device 10, and the first secondary reflective unit M1 corresponds to the other optical output end.

One of the two divided laser beams received by the first primary reflective unit M0 directly goes through the first primary reflective unit M0 and is further transmitted to one of the optical output ends, and the other divided laser beam is sequentially reflected by the first primary reflective unit M0 and the first secondary reflective unit M1 and is further transmitted to the other optical output end. The beam splitter 21 then sends the two divided laser beams to the respective light transmitters 22 and the two divided laser beams are transmitted to the respective light receivers 23 through the respective optical fibers 25. The two light receivers 23 further send the two divided laser beams to the beam combiner 24.

In the present embodiment, the beam combiner 24 includes a second housing 241, a second primary reflective unit N0 and a second secondary reflective unit N1. The second housing 241 has two optical input ends, an optical output end and a second receiving space. The second receiving space communicates with the optical input ends and the optical output end of the second housing 241.

The second primary reflective unit N0 and the second secondary reflective unit N1 are arranged in parallel in the second receiving space and are slanted at a second angle, such that the second primary reflective unit N0 and the second secondary reflective unit N1 correspond to the respective optical input ends of the second housing 211, and the second secondary reflective unit N0 corresponds to the optical output end of the second housing 241.

After the two light receivers 23 respectively send the two divided laser beams to the second primary reflective unit N0 and the second secondary reflective unit N1 through the respective optical input ends of the second housing 241, one of the two divided laser beams directly going through the second primary reflective unit N0 and the other divided laser beam sequentially reflected by the second secondary reflective unit N1 and the second primary reflective unit N0 are combined into an output laser beam which is irradiated to the objective lens 30 through the optical output end of the second housing 241 and is projected onto the target 40 through the objective lens 30.

In the present embodiment, the first primary reflective unit M0 and the second primary reflective unit N0 are half reflector mirrors allowing half of the light to go through the mirrors and the other half to be reflected, and the first secondary reflective unit M1 and the second secondary reflective unit N1 are reflector mirrors allowing the light to be reflected only. The two light transmitters 22 and the two light receivers 23 are fiber collimators.

Figure 2:
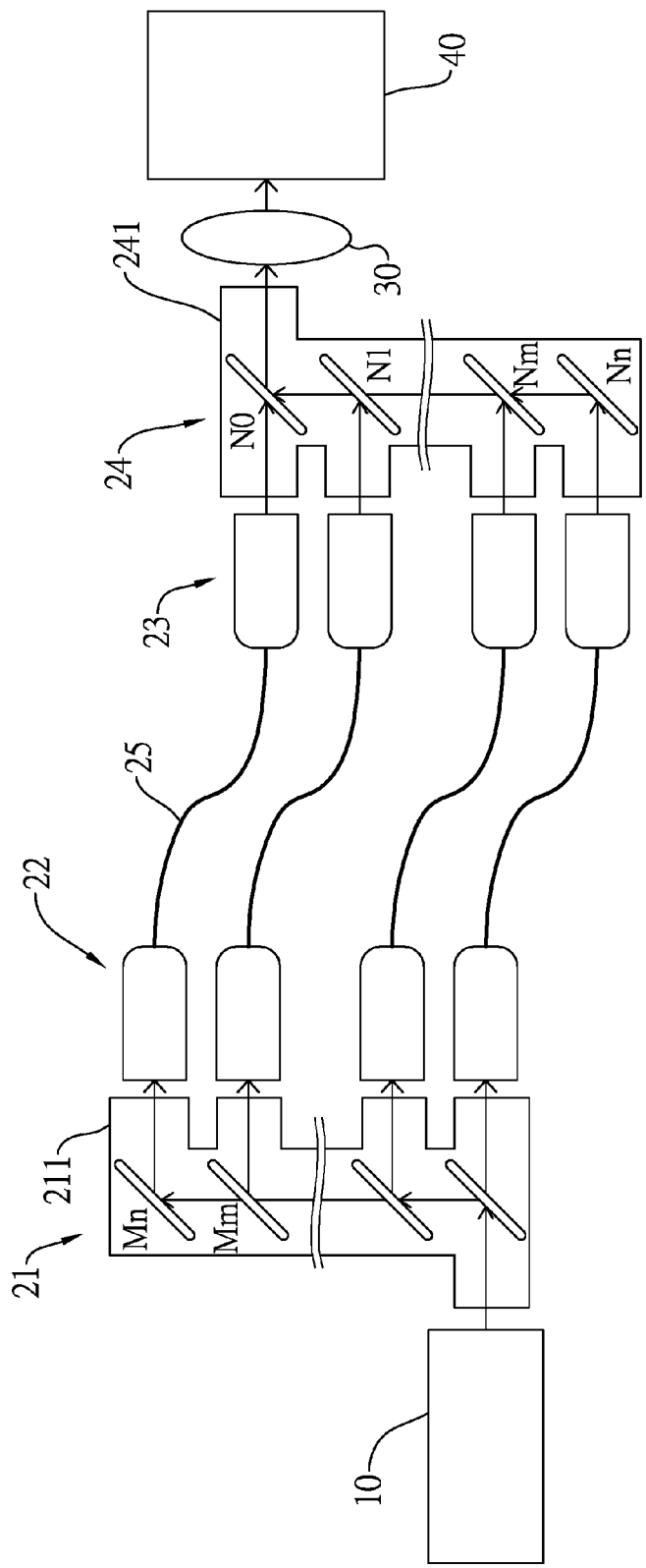
FIG. 2 is a schematic diagram showing system architecture of a second embodiment of an optical fiber transmission system with a laser beam splitting and combining device in accordance with the present invention.

With reference to FIG. 2, a second embodiment of an optical fiber transmission system with a laser beam splitting and combining device in accordance with the present invention differs from the foregoing embodiment in that the first housing 211 has more than two optical output ends, the second housing 241 has more than two optical input ends, and more than two light transmitters 22 and more than two light receivers 23 are available. Furthermore, multiple first secondary reflective units M1, . . . , Mm and Mn are mounted inside the first receiving space and multiple second secondary reflective units N1, . . . , Nm and Nn are mounted inside the second receiving space.

In the present embodiment, there are more than two optical fibers. When n+1 (n is a positive integer) optical fibers are used, the corresponding first primary reflective unit M0 and the second primary reflective unit N0 are reflector mirrors with reflectivity expressed by n/n+1 (n $nt^h$s). Given three optical fibers used as an example, the first primary reflective unit M0 is a reflector mirror with reflectivity expressed by ⅔, meaning that two thirds of the light is reflected by the mirror and one third of the light goes through the mirror.

FIG. 2 shows the first secondary reflective units M1, . . . , Mm and Mn, and the second secondary reflective units N1, . . . , Nm and Nn, where m represents a positive integer between 0 and n (0<m<n) and indicates the $m^{th}$ reflector mirror which is located between the orderly arranged reflector mirrors M0~Mn or N0~Nn. The reflectivity of each of the first secondary reflective units and the second secondary reflective units Mm, Nm is 1/(n−m+1). For example, the first secondary reflective unit or the second secondary reflective unit is a full reflection mirror with the reflectivity being one when m=n.

Figure 3:
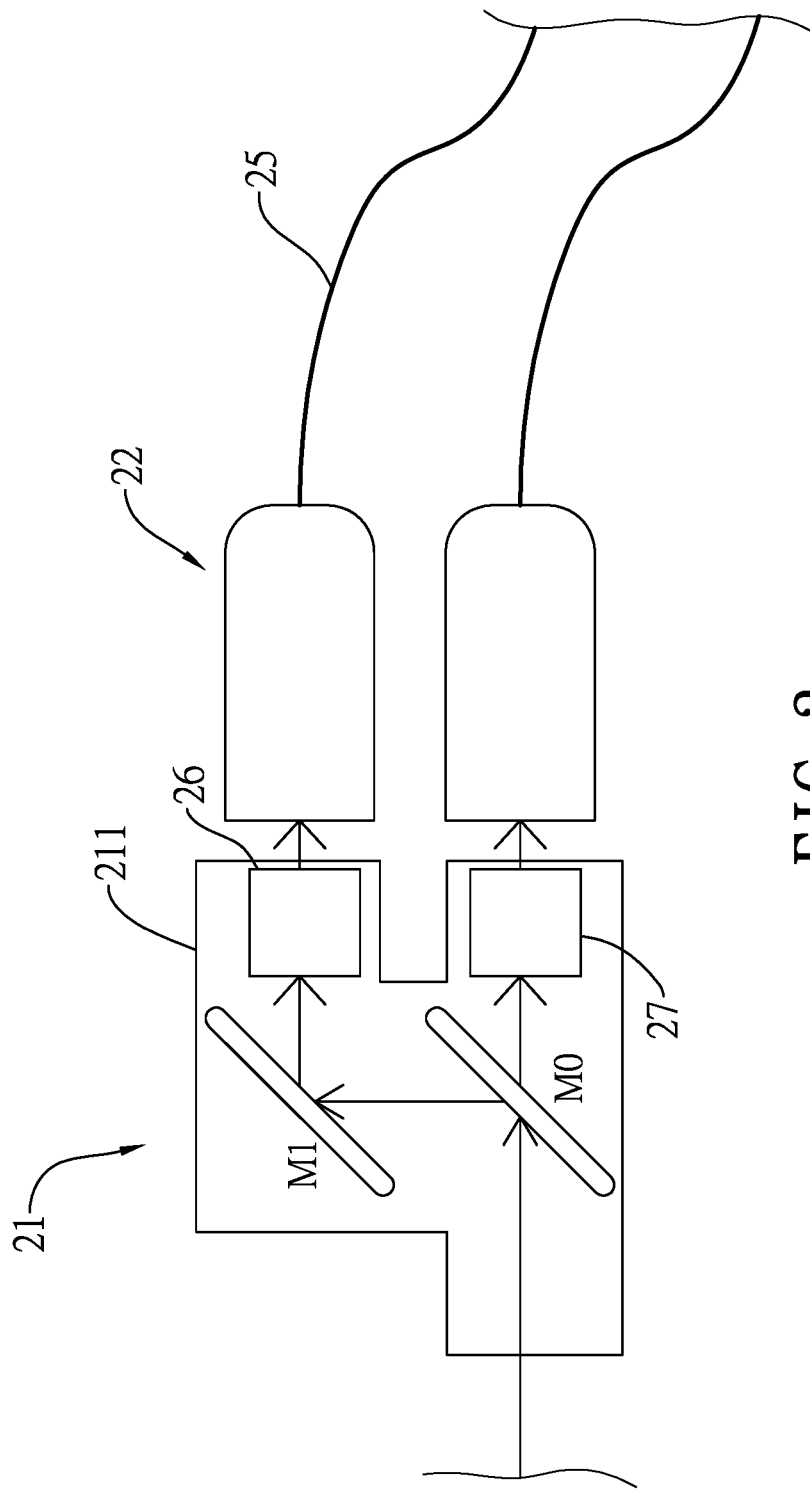
FIG. 3 is a schematic diagram showing a laser splitting device of a third embodiment of an optical fiber transmission system with a laser beam splitting and combining device in accordance with the present invention.

With reference to FIG. 3, a third embodiment of an optical fiber transmission system with a laser beam splitting and combining device in accordance with the present invention differs from the first embodiment in that the beam splitter 21 further has a first phase adjuster 26 and a second phase adjuster 27. The first phase adjuster 26 is mounted between the first secondary reflective unit M1 and one of the optical output ends, and the second phase adjuster 27 is mounted between the first primary reflective unit M0 and the other optical output end. The beam splitter 21 employs the first phase adjuster 26 and the second phase adjuster 27 to adjust the phase difference of different light beams when meeting each other for avoidance of energy attenuation of the light beams.

In the present embodiment, the first phase adjuster 26 and the second phase adjuster 27 are each respectively formed by an optical path difference fine tuning module.

Even though numerous characteristics and advantages of the present invention have been set forth in the foregoing description, together with details of the structure and function of the invention, the disclosure is illustrative only.

Changes may be made in detail, especially in matters of shape, size, and arrangement of parts within the principles of the invention to the full extent indicated by the broad general meaning of the terms in which the appended claims are expressed.

What is claimed is:

1. An optical fiber transmission system, comprising:
an objective lens;
a target;
a laser device irradiating a laser beam; and
a laser beam splitting and combining device including:
   a beam splitter receiving the laser beam irradiated by the laser device and dividing the laser beam into two laser beams with one of the divided laser beams going through the beam splitter and the other divided laser beam reflected by the beam splitter;
   two light transmitters connected to the beam splitter and respectively transmitting the divided laser beams;
   two light receivers respectively connected to the two light transmitters through two optical fibers and receiving the divided laser beams; and
   a beam combiner connected to the light receivers, receiving the divided laser beams, combining the divided laser beams into an output laser beam, and transmitting the output laser beam to be projected onto the target through the objective lens.

2. The optical fiber transmission system as claimed in claim 1, wherein the beam splitter includes:
a first housing having:
   an optical input end;
   two optical output ends; and
   a first receiving space defined inside the first housing and communicating with the optical input end and the optical output ends of the first housing;
a first primary reflective unit mounted inside the first receiving space, corresponding to the optical input end of the first housing, and receiving the laser beam irradiated by the laser device; and
a first secondary reflective unit mounted inside the first receiving space.

3. The optical fiber transmission system as claimed in claim 2, wherein one of the divided laser beams received by the first primary reflective unit goes through the first primary reflective unit and is further transmitted to one of the two optical output ends of the first housing, and the other divided laser beam is sequentially reflected by the first primary reflective unit and the first secondary reflective unit and is further transmitted to the other optical output end of the first housing.

4. The optical fiber transmission system as claimed in claim 1, wherein the beam combiner includes:
a second housing having:
   two optical input ends;
   an optical output end; and
   a second receiving space defined inside the second housing and communicating with the optical input ends and the optical output end of the second housing;
a second primary reflective unit mounted inside the second receiving space, corresponding to one of the optical input ends and the optical output end of the second housing; and
a second secondary reflective unit mounted inside the second receiving space and corresponding to the other optical input end of the second housing;
wherein after the two light receivers respectively send the two divided laser beams to the second primary reflective unit and the second secondary reflective unit through the respective optical input ends of the second housing, one of the two divided laser beams going through the second primary reflective unit and the other divided laser beam sequentially reflected by the second secondary reflective unit and the second primary reflective unit are combined into an output laser beam irradiated to the objective lens through the optical output end of the second housing and projected onto the target through the objective lens.

* * * * *